United States Patent [19]

Jensen

[11] 4,003,118

[45] Jan. 18, 1977

[54] HOG STAPLE GUN

[75] Inventor: George W. Jensen, Pensacola, Fla.

[73] Assignee: The Raymond Lee Organization, Inc., New York, N.Y. ; a part interest

[22] Filed: Mar. 11, 1976

[21] Appl. No.: 666,129

[52] U.S. Cl. .......................................... 29/243.56
[51] Int. Cl.² ........................................ B23P 11/00
[58] Field of Search ....... 29/243.56, 243.5, 243.52, 29/243.57; 227/83

[56] References Cited

UNITED STATES PATENTS

| | | | |
|---|---|---|---|
| 3,940,841 | 3/1976 | Velarde et al. | 29/243.56 |

FOREIGN PATENTS OR APPLICATIONS

| | | | |
|---|---|---|---|
| 1,063,434 | 12/1953 | France | 29/243.56 |
| 751,059 | 6/1956 | United Kingdom | 29/243.56 |

*Primary Examiner*—James L. Jones, Jr.
*Attorney, Agent, or Firm*—Daniel Jay Tick

[57] ABSTRACT

A flat barrel-type housing has spaced opposite first and second ends and an axial chamber formed therethrough, extending between the ends and opening at the second end of the housing. A pistol-type hand grip extends from the housing in the area of the second end thereof and extends perpendicularly from the chamber. A guide is mounted in the feed bore and extends out of the housing for movably guiding a stack of hog staples individually into the chamber. A pair of curved arms extend from the housing at the second end thereof on opposite sides of the opening of the chamber thereat. The arms open toward each other to form a circular area therebetween and have free ends spaced from each other. A feed device operated by the holder of the gun moves a single staple at a time from the guide in the chamber at the feed bore through the chamber and the opening at the second end of the housing into contact with the arms whereby the arms form a circle of each staple.

3 Claims, 9 Drawing Figures

HOG STAPLE GUN

BACKGROUND OF THE INVENTION

The present invention relates to a hog staple gun.

Objects of the invention are to provide a hog staple gun, of simple structure, which is inexpensive in manufacture, used with facility and convenience, and functions efficiently, effectively and reliably to apply large sized heavy "hog" staples, as desired.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
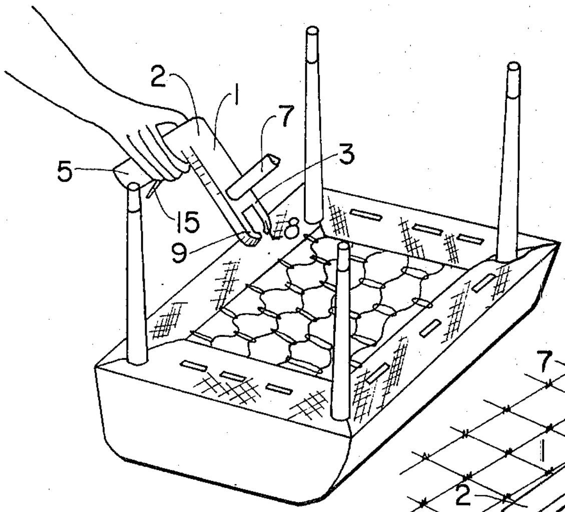
FIG. 1 is a perspective view of an embodiment of the staple gun of the invention in use.
Figure 3:
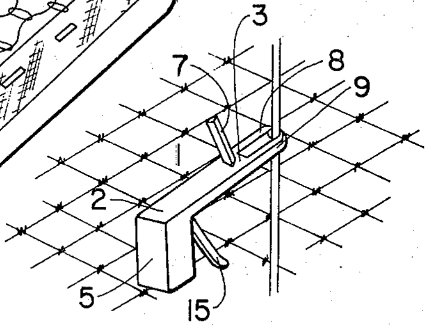
FIG. 3 is a perspective view of the staple gun of the invention in use.
Figure 5:
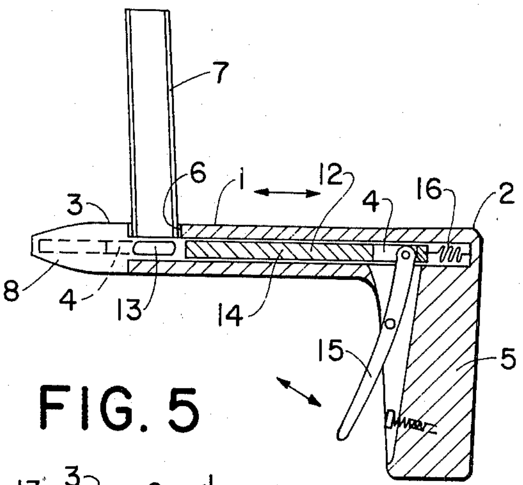
FIG. 5 is a side view, partly in section, of an embodiment of the hog staple gun of the invention.
Figure 6:
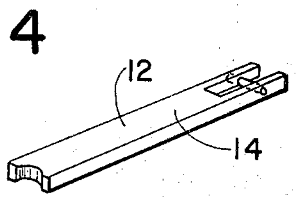
FIG. 6 is a perspective view of an embodiment of the feed device of the staple gun of the invention.
Figure 8:
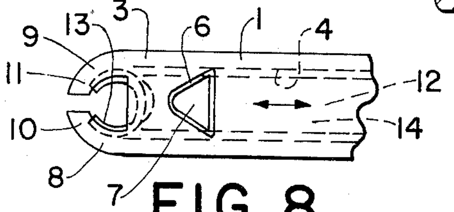
FIG. 8 is a top view, on an enlarged scale, of part of the embodiment of FIG. 5.
Figure 7:
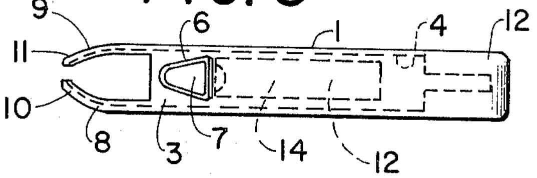
FIG. 7 is a top view of the embodiment of FIG. 5.
Figure 9:
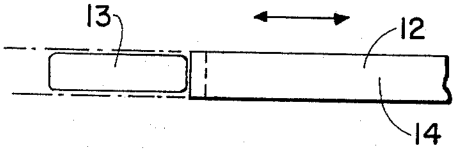
FIG. 9 is a schematic diagram, on an enlarged scale, of a staple and part of the feed device of FIG. 6.

The hog staple gun of the invention comprises a flat barrel-type housing 1 having spaced opposite first and second ends 2 and 3, respectively (FIGS. 1, 3, 5 and 7) and an axial chamber 4 formed therethrough (FIGS. 5, 7 and 8), extending between said ends and opening at the second end 3 of the housing. A pistol-type hand grip 5 (FIGS. 1, 3 and 5) extends from the housing 1 at the first end 2 thereof.

A feed bore 6 (FIGS. 5, 7 and 8) is formed through the housing 1 in the area of the second end 3 thereof and extends substantially perpendicularly from the chamber 4.

Figure 4:
FIG. 4 is a view of a staple of the type applied by the staple gun of the invention.

A guide 7 is mounted in the feed bore 6 and extends out of the housing 1 for movably guiding a stack of hog staples, of the type shown in FIG. 4, individually into the chamber 4 (FIGS. 1, 3, 5, 7 and 8).

A pair of curved arms 8 and 9 (FIGS. 1, 3, 7 and 8) extend from the housing 1 at the second end 3 thereof on opposite sides of the opening of the chamber 4 thereat. The arms 8 and 9 curve toward each other to form a substantially circular area therebetween and have free ends 10 and 11, respectively (FIGS. 7 and 8), spaced from each other.

Figure 2:
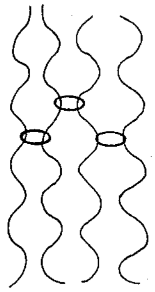
FIG. 2 is a schematic diagram illustrating staples applied by the staple gun of the invention.

A feed device 12 (FIGS. 5 to 9) is operated by a holder or user of the gun for moving a single staple such as, for example, the staple 13 (FIGS. 8 and 9) at a time from the guide 7 in the chamber 4 at the feed bore 6 through the chamber and the opening at the second end 3 of the housing into contact with the arms 8 and 9 whereby said arms form a substantial circle of each staple, as shown in FIG. 2. The feed device 12 comprises a feed member 14 slidably mounted in the chamber 4 for movement from the first end 2 to the second end 3 of the housing 1 (FIGS. 5 to 9). The feed device further comprises a manually operable pivotally mounted trigger 15 (FIGS. 1, 3 and 5) coupled at one end to the feed member 14 and extending out of the housing 1 for moving the feed member toward the second end 3. A spring 16 in the chamber 4, shown in FIG. 5, functions to return the feed member 14 toward the first end 2.

While the invention has been described by means of a specific example and in a specific embodiment, I do not wish to be limited thereto, for obvious modifications will occur to those skilled in the art without departing from the spirit and scope of the invention.

I claim:

1. A hog staple gun, comprising a flat barrel-type housing having spaced opposite first and second ends and an axial chamber formed therethrough, extending between said ends and opening at the second end of said housing;

a pistol-type hand grip extending from the housing at the first end thereof;

a feed bore formed through the housing in the area of the second end thereof and extending substantially perpendicularly from the chamber;

guide means mounted in the feed bore and extending out of the housing for movably guiding a stack of hog staples individually into the chamber;

a pair of curved arms extending from the housing at the second end thereof on opposite sides of the opening of the chamber thereat, said arms curving toward each other to form a substantially circular area therebetween and having free ends spaced from each other; and feed means operated by a holder of the gun for moving a single staple at a time from the guide means in the chamber at the feed bore through the chamber and the opening at the second end of the housing into contact with the arms whereby said arms form a substantial circle of each staple.

2. A hog staple gun as claimed in claim 1, wherein the feed means comprises a feed member slidably mounted in the chamber for movement from the first to the second end of the housing and a manually operable pivotally mounted trigger coupled at one end to the feed member and extending out of said housing for moving said feed member toward said second end.

3. A hog staple gun as claimed in claim 1, wherein said feed means further comprises spring means in the chamber for returning said feed member toward said first end.

* * * * *